US012610186B2

(12) United States Patent
Zhao

(10) Patent No.: US 12,610,186 B2
(45) Date of Patent: Apr. 21, 2026

(54) ELECTRONIC DEVICE AND FAR-FIELD MUFFLING SELF-CALIBRATION METHOD AND SYSTEM THEREFOR

(71) Applicant: Goertek Inc., Weifang (CN)

(72) Inventor: Zhongxu Zhao, Shandong (CN)

(73) Assignee: Goertek Inc., Weifang (CN)

( * ) Notice: Subject to any disclaimer, the term of this patent is extended or adjusted under 35 U.S.C. 154(b) by 197 days.

(21) Appl. No.: 18/705,698

(22) PCT Filed: Dec. 9, 2021

(86) PCT No.: PCT/CN2021/136607

§ 371 (c)(1),
(2) Date: Apr. 29, 2024

(87) PCT Pub. No.: WO2023/070848

PCT Pub. Date: May 4, 2023

(65) Prior Publication Data

US 2025/0008265 A1 Jan. 2, 2025

(30) Foreign Application Priority Data

Oct. 29, 2021 (CN) ........................ 202111277186.1

(51) Int. Cl.

| | |
|---|---|
| ***G10K 11/16*** | (2006.01) |
| ***H04R 1/10*** | (2006.01) |
| ***H04R 3/04*** | (2006.01) |
| ***H04R 29/00*** | (2006.01) |
| *H04R 3/02* | (2006.01) |

(52) U.S. Cl.
CPC ............. *H04R 3/04* (2013.01); *H04R 1/1083* (2013.01); *H04R 29/001* (2013.01); *H04R 2430/01* (2013.01); *H04R 2460/01* (2013.01)

(58) Field of Classification Search
CPC ...... H04R 3/04; H04R 1/1083; H04R 29/001; H04R 2430/01
USPC ................................................ 381/71.8, 73.1
See application file for complete search history.

(56) References Cited

FOREIGN PATENT DOCUMENTS

| | | | | |
|---|---|---|---|---|
| CN | 108966084 A | * 12/2018 | ............... | H04R 3/04 |
| CN | 112637724 A | 4/2021 | | |

* cited by examiner

*Primary Examiner* — Ammar T Hamid
(74) *Attorney, Agent, or Firm* — Baker Botts LLP

(57) ABSTRACT

A far-field muffling self-calibration method for an electronic device is disclosed, comprising: controlling the first speaker and the second speaker to play a first audio; obtaining a first frequency response curve through a sound signal acquired by the first microphone; judging whether a far-field muffling for the electronic device is qualified based on the first frequency response curve; if not qualified, adjusting a first transfer function and/or a second transfer function based on a first preset calibration rule, and returning to execute said controlling the first speaker and the second speaker to play the a same first audio; wherein the first and the second transfer functions represent sound signal transfer functions respectively from the first speaker and the second speaker to the first microphone.

10 Claims, 5 Drawing Sheets

ELECTRONIC DEVICE AND FAR-FIELD MUFFLING SELF-CALIBRATION METHOD AND SYSTEM THEREFOR

CROSS-REFERENCE TO RELATED APPLICATIONS

The present disclosure is a National Stage of International Application No. PCT/CN2021/136607, filed on Dec. 9, 2021, which claims priority to a Chinese patent application No. 202111277186.1 filed with the CNIPA on Oct. 29, 2021 and entitled "ELECTRONIC DEVICE AND FAR-FIELD MUFFLING SELF-CALIBRATION METHOD AND SYSTEM THEREFOR", both of which are hereby incorporated by reference in their entireties.

TECHNICAL FIELD

The present disclosure relates to the field of signal processing, and particularly to an electronic device and a far-field muffling self-calibration method and system therefor.

BACKGROUND

Currently, more and more electronic devices for Virtual Reality (VR), Augmented Reality (AR), etc. are focusing on far-field muffling performance. In other words, to reduce sound leakage through the design of a structure and Digital Signal Process (DSP), thereby protecting privacy of a user. Wherein, the dual-speaker solution has gradually become the current technology development trend due to the good symmetry of the structural design and the convenience for switching the muffling mode. However, although there is desirable symmetry in the theoretical design, due to factors such as the design tolerances, assembly errors of structural parts, etc., there will still be frequency response and phase differences between the two speakers, which have negative influence on the far-field muffling performance.

To sum up, how to effectively improve the far-field muffling performance of an electronic device has recently become a technical problem that demands urgent solution by those skilled in the art.

SUMMARY

The present disclosure is directed to an electronic device and a far-field muffling self-calibration method and system therefor, so as to effectively improve the far-field muffling performance for the electronic device.

To solve the above technical problem, the present disclosure provides following technical solutions.

A far-field muffling self-calibration method for an electronic device is provided, which comprises a first speaker, a second speaker, a processor and a first microphone, and the calibration method for the electronic device comprises;

controlling the first speaker and the second speaker to play the same first audio:

obtaining a first frequency response curve through a sound signal acquired by the first microphone, wherein the sound signal for obtaining the first frequency response curve is obtained by the first speaker and the second speaker playing the same first audio;

judging whether a far-field muffling for the electronic device is qualified based on the first frequency response curve;

if not qualified, adjusting a first transfer function and/or a second transfer function based on a first preset calibration rule, and returning to execute an operation step of the "controlling the first speaker and the second speaker to play the same first audio";

wherein the first transfer function represents a sound signal transfer function from the first speaker to the first microphone, and the second transfer function represents a sound signal transfer function from the second speaker to the first microphone.

Optionally, said "judging whether a far-field muffling for the electronic device is qualified based on the first frequency response curve" comprises:

judging whether an error between the first frequency response curve and a preset first standard frequency response curve at each designated frequency is within a corresponding preset error range;

if so, judging that the far-field muffling for the electronic device is qualified;

if not, judging that the far-field muffling for the electronic device is not qualified.

Optionally, said "adjusting a first transfer function and/or a second transfer function based on a first preset calibration rule, and returning to execute an operation step of the 'controlling the first speaker and the second speaker to play the same first audio'" comprises;

controlling the first speaker to play a second audio;

obtaining a second frequency response curve through a sound signal acquired by the first microphone, wherein the sound signal for obtaining the second frequency response curve is obtained by the first speaker playing the second audio;

controlling the second speaker to play the second audio;

obtaining a third frequency response curve through a sound signal acquired by the first microphone, wherein the sound signal for obtaining the third frequency response curve is obtained by the second speaker playing the second audio;

subtracting the third frequency response curve from the second frequency response curve to obtain a compensation function that is to be fed back into the first transfer function or the second transfer function, and returning to execute the operation step of the "controlling the first speaker and the second speaker to play the same first audio".

Optionally, the electronic device further comprises a second microphone, and when the electronic device is used by a user, a distance between the first microphone and a user's mouth is greater than a distance between the second microphone and the user's mouth.

Optionally, the electronic device further comprises a second microphone, and the calibration method for an electronic device comprises:

when it is judged that an uplink noise cancellation self-calibration condition is met, completing an uplink noise cancellation self-calibration for the electronic device based on the first microphone, the second microphone, the first speaker and the second speaker.

Optionally, said "it is judged that an uplink noise cancellation self-calibration condition is met" comprises:

when an uplink noise cancellation self-calibration command input by a user is received, or when it is detected that an interval between a current time point and a time point when the uplink noise cancellation self-calibration for the electronic device was completed last time has reached a preset first duration, judging that the noise cancellation self-calibration condition is met.

Optionally, said "completing an uplink noise cancellation self-calibration for the electronic device based on the first microphone, the second microphone, the first speaker and the second speaker" comprises:

controlling the first speaker or the second speaker to play a third audio after the uplink noise cancellation self-calibration is initiated;

obtaining a fourth frequency response curve through a sound signal acquired by the first microphone, and obtaining a fifth frequency response curve through a sound signal acquired by the second microphone, wherein the sound signal for obtaining the fourth frequency response curve is obtained by the first speaker or the second speaker playing the third audio, and the sound signal for obtaining the fifth frequency response curve is obtained by the first speaker or the second speaker playing the third audio;

judging whether an error between the fourth frequency response curve and the fifth frequency response curve at each designated frequency is within a corresponding preset error range;

if so, judging that the uplink noise cancellation for the electronic device is qualified;

if not, judging that the uplink noise cancellation for the electronic device is not qualified, adjusting a third transfer function and/or a fourth transfer function under a second preset calibration rule, and returning to execute an operation step of the "controlling the first speaker or the second speaker to play a third audio";

wherein the third transfer function represents a sound signal transfer function from the first microphone to the first speaker, and the fourth transfer function represents a sound signal transfer function from the second microphone to the first speaker.

Optionally, said "adjusting a third transfer function and/or a fourth transfer function under a second preset calibration rule, and returning to execute an operation step of the 'controlling the first speaker or the second speaker to play a third audio'" comprises:

controlling the first speaker or the second speaker to play a fourth audio;

obtaining a sixth frequency response curve through a sound signal received by the first microphone, and obtaining a seventh frequency response curve through a sound signal received by the second microphone, wherein the sound signal for obtaining the sixth frequency response curve is obtained by the first speaker or the second speaker playing the fourth audio, and the sound signal for obtaining the seventh frequency response curve is obtained by the first speaker or the second speaker playing the fourth audio;

obtaining a compensation function that is to be fed back into the third transfer function by subtracting a preset second standard frequency response curve from the sixth frequency response curve, obtaining a compensation function that is to be fed back into the fourth transfer function by subtracting the preset second standard frequency response curve from the seventh frequency response curve, and returning to execute an operation step of the "controlling the first speaker or the second speaker to play a third audio".

A far-field muffling self-calibration system for an electronic device is provided, which comprises a first speaker, a second speaker, a first microphone and a processor, and the processor is configured for;

controlling the first speaker and the second speaker to play the same first audio; obtaining a first frequency response curve through a sound signal acquired by the first microphone, wherein the sound signal for obtaining the first frequency response curve is obtained by the first speaker and the second speaker playing the same first audio; judging whether a far-field muffling for the electronic device is qualified based on the first frequency response curve; if not qualified, adjusting a first transfer function and/or a second transfer function based on a first preset calibration rule, and returning to execute an operation step of the "controlling the first speaker and the second speaker to play the same first audio";

wherein the first transfer function represents a sound signal transfer function from the first speaker to the first microphone, and the second transfer function represents a sound signal transfer function from the second speaker to the first microphone.

An electronic device is provided, which comprises the above calibration system for an electronic device.

In the technical solution provided by the embodiments of the present disclosure, a design solution of the dual-speaker for realizing far-field muffling is adopted, which thus helps to take advantage of the benefits of the good symmetry of the structural design and the convenience of switching the muffling mode of the dual-speaker. Further, the present disclosure also executes the far-field muffling self-calibration, so as to further improve the far-field muffling performance for the electronic device. When executing the far-field muffling self-calibration, the solution of the present disclosure controls the first speaker and the second speaker to play the same first audio by the processor, and the first frequency response curve may be obtained through the sound signal acquired by the first microphone. The performance of the far-field muffling for the electronic device influences the first frequency response curve obtained by the processor. That is, the first frequency response curve may effectively reflect the far-field muffling performance of the electronic device. Therefore, the processor will judge whether the far-field muffling for the electronic device is qualified through the first frequency response curve. If it is not qualified, then it means that the far-field muffling calibration of the electronic device is required. The sound signal transfer function from the first speaker to the first microphone, and the sound signal transfer function from the second speaker to the first microphone, both influence the far-field muffling performance of the electronic device. Therefore, the present disclosure adjusts the first transfer function and/or the second transfer function through the preset first preset calibration rules, thereby completing the far-field muffling calibration of the electronic device. That is, after the calibration is completed, it is possible to determine whether the far-field muffling for the electronic device is qualified from the first frequency response curve. In summary; the present disclosure effectively improves the far-field muffling performance for the electronic device by the far-field muffling calibration.

BRIEF DESCRIPTION OF THE DRAWINGS

In order to clearly illustrate embodiments of the present application or technical solutions in the prior art, accompanying drawings that need to be used in description of the embodiments or the prior art will be briefly introduced as follows. Obviously, drawings in following description are only a few embodiments of the present application. For those skilled in the art, other drawings can also be obtained according to the disclosed drawings without creative efforts

DETAILED DESCRIPTION

The core of the present disclosure is to provide a calibration method for the electronic device, and through the far-field muffling calibration, the far-field muffling performance for the electronic device is effectively improved.

In order to enable persons in the art to better understand the solution of the present disclosure, the present disclosure is further described in detail below in conjunction with the accompanying drawings and embodiments. Obviously, the described embodiments are only a few embodiments of the present disclosure, not all embodiments. Based on the embodiments in the present disclosure, all other embodiments obtained by a person skilled in the art without creative work shall fall within the scope of protection of the present disclosure.

Figure 1:
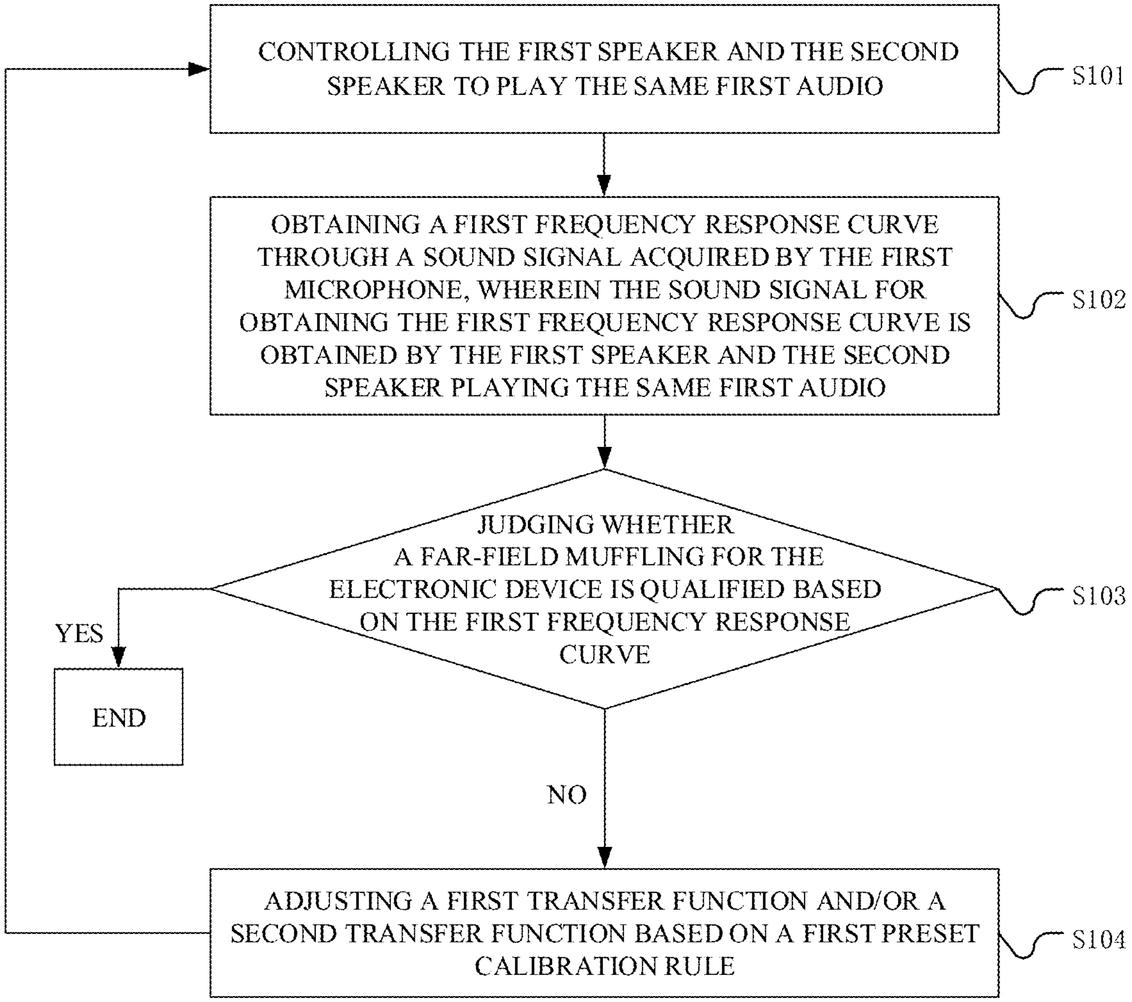
FIG. 1 shows a flowchart of an implementation of a far-field muffling self-calibration method for an electronic device of the present disclosure.

Please refer to FIG. 1, which shows a flowchart of an implementation of a far-field muffling self-calibration method for an electronic device of the present disclosure. The electronic device of the present disclosure comprises a first speaker, a second speaker, a processor, and a first microphone. This calibration method for the electronic device may comprise the following steps:

Step S101: controlling the first speaker and the second speaker to play the same first audio;

Specifically, the electronic device of the present disclosure adopts a dual-speaker to implement far-field muffling, and may be an electronic device with an audio function such as VR, AR, and smart glasses.

The processor may enable the far field muffling self-calibration for the electronic device, and the specific triggering mode can be set and adjusted as required. For example, the far field muffling self-calibration for the electronic device may be initiated periodically, may be performed every time the electronic device is powered on, or may be manually selected by the user as to whether the far field muffling self-calibration of the electronic device needs to be initiated.

When the far field muffling self-calibration for the electronic device is initiated, the steps S101 of the present disclosure may be executed. The present disclosure needs to control the first speaker and the second speaker to play the same first audio, that is, simultaneously control the first speaker and the second speaker to play the same first audio.

Step S102: obtaining a first frequency response curve through a sound signal acquired by the first microphone, wherein the sound signal for obtaining the first frequency response curve is obtained by the first speaker and the second speaker playing the same first audio.

After the processor initiates the far-field muffling self-calibration, the processor will simultaneously control the first speaker and the second speaker to play the same first audio, the first audio is an electrical signal, and the specific form of the first audio may be set and adjusted as needed without influencing the implementation of the present disclosure. The first speaker and second speaker receive the first audio from the processor simultaneously and convert it into corresponding sound signals for playing. The present disclosure collects sound signals through the first microphone, that is, the sound signals collected at this time have both the content played by the first speaker and the content played by the second speaker. Accordingly, the sound signal for obtaining the first frequency response curve is collected by the first microphone after the first speaker and the second speaker having played the same first audio. The first frequency response curve corresponding to the sound signal may be obtained by data processing of the sound signal collected by the first microphone.

Step S103: judging whether a far-field muffling for the electronic device is qualified based on the first frequency response curve. If not qualified, then a step S104 may be executed. Of course, if the judgment result of step S103 is qualified, the current process of the far-field muffling self-calibration may be ended.

The performance of the far-field muffling for the electronic device will influence the first frequency response curve obtained by the first microphone. Therefore, whether the far-field muffling is qualified may be judged from the first frequency response curve.

There are many ways to judge whether the far-field muffling for the electronic device is qualified through the first frequency response curve. For example, the judgment may be made based on the amplitude information of the first frequency response curve. Further, in the practical application, in order to ensure that the far-field muffling may be effectively realized for the sound at each frequency band, whether the first frequency response curve is qualified or not may be judged according to frequency bands, thereby ensuring that the far-field muffling performance for the electronic device has good performance in each sound frequency band. For example, in a specific embodiment of the present disclosure, the step S103 may specifically comprise: judging whether an error between the first frequency response curve and a preset first standard frequency response curve at each designated frequency is within a corresponding preset error range;

if so, judging that the far-field muffling for the electronic device is qualified;

if not, judging that the far-field muffling for the electronic device is not qualified.

In this embodiment, the processor, by judging whether an error between the first frequency response curve and a preset first standard frequency response curve at each designated frequency is within a corresponding preset error range, it is determined whether the far-field muffling for the electronic device is qualified or not.

It can be understood that the number of designated frequencies, as well as the specific value of each designated frequency, may be set and adjusted according to an actual need. And it can be understood that the more the number of the designated frequencies is, the smaller the preset error range is selected, and the higher the requirement for the first frequency response curve is, that is, the first frequency response curve is required to be closer to the first standard frequency response curve.

In addition, each designated frequency may have its own corresponding preset error range. Of course, in practical applications, in order to facilitate program design, the preset error range corresponding to each designated frequency may usually be set consistently, which will not significantly degrade the accuracy.

The first standard frequency response curve is an ideal frequency response curve which may be obtained based on the sound signal acquired by the first microphone after the processor simultaneously controls the first speaker and the second speaker to play the same first audio under the condition that the electronic device has ideal far-field muffling performance, and may be set through theoretical analysis in combination with experimental data. Therefore, the closer the first frequency response curve is to the predetermined first standard frequency response curve, the better the far-field muffling performance for the electronic device is. If it is judged that an error between the first frequency response curve and a preset first standard frequency response curve at each designated frequency is within a corresponding preset error range, then it indicates that the far-field muffling for the electronic device is qualified, and then the current far-field muffling self-calibration process for the electronic device may be ended directly; otherwise, it may be considered that the far-field muffling for the electronic device is not qualified, and the present disclosure implements the far-field field muffling calibration according to the first preset calibration rule.

Step S104: adjusting a first transfer function and/or a second transfer function based on a first preset calibration rule, and returning to execute the operation step of S101.

Wherein, the first transfer function represents the sound signal transfer function from the first speaker to the first microphone, and the second transfer function represents the sound signal transfer function from the second speaker to the first microphone.

If it is judged that an error between the first frequency response curve and a preset first standard frequency response curve at any one designated frequency is not within a set error range corresponding to the designated frequency, it may be considered that the far-field muffling for the electronic device is not qualified. In this disclosure, the first transfer function and/or the second transfer function will be adjusted under the first preset calibration rules until the far-field muffling for the electronic device is judged to be qualified from the first frequency response curve.

The specific content of the first preset calibration rule may be set according to actual needs, as long as the far-field muffling for the electronic device may be judged to be qualified from the first frequency response curve after calibration, that is, as long as the far-field muffling self- calibration may be achieved. In general, the far-field muffling self-calibration may be achieved by negative feedback, which is more convenient and reliable.

For example, in a specific embodiment of the present disclosure, the step S104 may specifically comprises:

controlling the first speaker to play a second audio;

obtaining a second frequency response curve through a sound signal acquired by the first microphone, wherein the sound signal for obtaining the second frequency response curve is obtained by the first speaker playing the second audio;

controlling the second speaker to play the second audio;

obtaining a third frequency response curve through a sound signal acquired by the first microphone, wherein the sound signal for obtaining the third frequency response curve is obtained by the second speaker playing the second audio;

subtracting the third frequency response curve from the second frequency response curve to obtain a compensation function that is to be fed back into the first transfer function or the second transfer function, and returning to execute the operation step of S101.

In this embodiment, during the far-field muffling calibration, the processor will control the first speaker and the second speaker to play the same second audio successively, thereby obtaining the corresponding second frequency response curve and third frequency response curve respectively through the first microphone. That is, after the first speaker is controlled to play the second audio, the second frequency response curve may be obtained based on the sound signal collected by the first microphone, and the sound signal used to obtain the second frequency response curve is the sound signal collected by the first microphone after the first speaker plays the second audio. After the second speaker is controlled to play the second audio, the third frequency response curve may be obtained based on the sound signal collected by the first microphone, and the sound signal used to obtain the third frequency response curve is the sound signal collected by the first microphone after the second speaker plays the second audio.

The specific content of the second audio may be set in advance as desired. And it is to be understood that in the solution of the present disclosure, the first audio needs to be utilized in judging whether the far-field muffling for the electronic device is qualified or not, and in this embodiment, the second audio needs to be utilized in adjusting the first transfer function and/or the second transfer function based on the first preset calibration rule. That is, the first audio is applied in the process of judging whether the far-field muffling is qualified, and the second audio is applied in the calibration process of adjusting the first transfer function and/or the second transfer function. In practice, the specific contents of both the first audio and the second audio may be set as needed, and the contents of the two may be the same or different, and on some occasions, when the first audio and the second audio are selected to be the same, only one audio may be stored, and that audio may be selected as the first audio and the second audio, respectively, during the process of judging whether the far-field muffling is qualified, and during the calibration process of adjusting the first transfer function and/or the second transfer function.

Figure 2A:
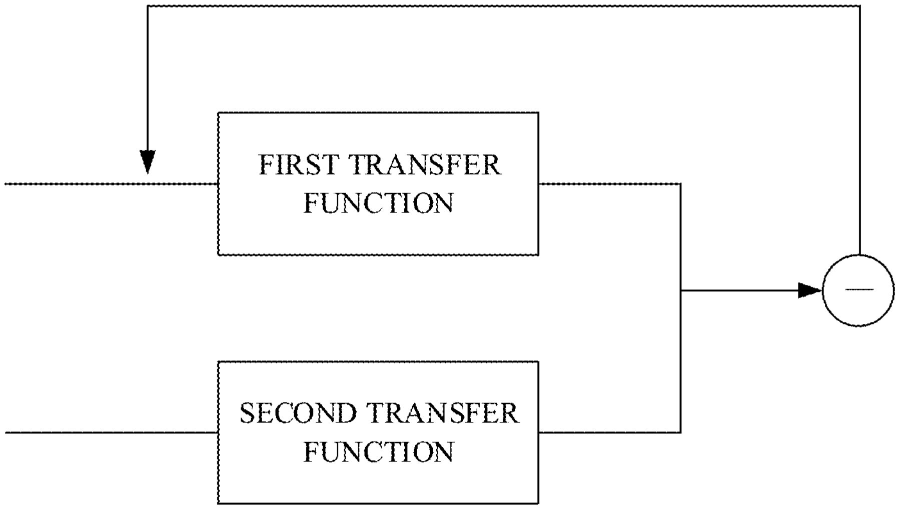
FIG. 2*a* shows a schematic diagram of an algorithmic framework where a compensation function is feedback to a first transfer function in the present disclosure.
Figure 2B:
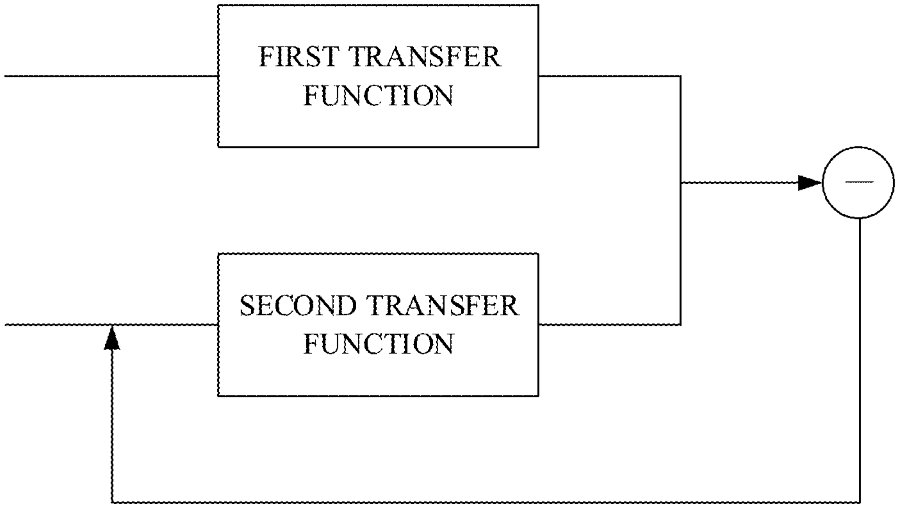
FIG. 2*b* shows a schematic diagram of an algorithmic framework where the compensation function is feedback to a second transfer function in the present disclosure.

When the far-field muffling performance for the electronic device is good, the resulting second frequency response curve and the third frequency response curve should be identical, and thus, the compensation function obtained by subtracting the third frequency response curve from the second frequency response curve may be fed back to the first transfer function or the second transfer function, so as to reduce the difference between the second frequency response curve and the third frequency response curve in a negative feedback manner. FIGS. 2*a* and 2*b* of the present disclosure represent schematic diagrams of an algorithmic framework where a compensation function is feedback to a first transfer function and a second transfer function, respectively.

After obtaining the compensation function for feedback to the first transfer function or the second transfer function and performing one feedback with the compensation function, it is possible to return to performing the operation of controlling the first speaker and the second speaker to play the same first audio in step S101, so as to rejudge whether the far-field muffling for the electronic device is qualified. In this way, through one or more rounds of feedback, it is possible to finally determine whether the far-field muffling of the electronic device is qualified from the first frequency response curve, and thus end the far-field muffling self-calibration of the electronic device.

In the above solution of the present disclosure, the far-field muffling self-calibration may be achieved by using the first speaker, the second speaker and the first microphone, and in practical applications, the electronic device may have a larger number of speakers or microphones, such as in one case, the electronic device also comprises a second microphone. The present disclosure takes into account that when selecting the first microphone to implement the far-field muffling self-calibration, the microphone selected should be a microphone that is farther away from the user's mouth, which is more conducive to reflecting the far-field sound reception than a microphone that is closer to the user's mouth. Therefore, in this embodiment, when the electronic device is used by the user, the distance between the first microphone and the user's mouth is greater than the distance between the second microphone and the user's mouth. In other words, the microphone far from the user's mouth is selected as the first microphone, which is beneficial for improving the accuracy of far-field muffling calibration.

Figure 3:
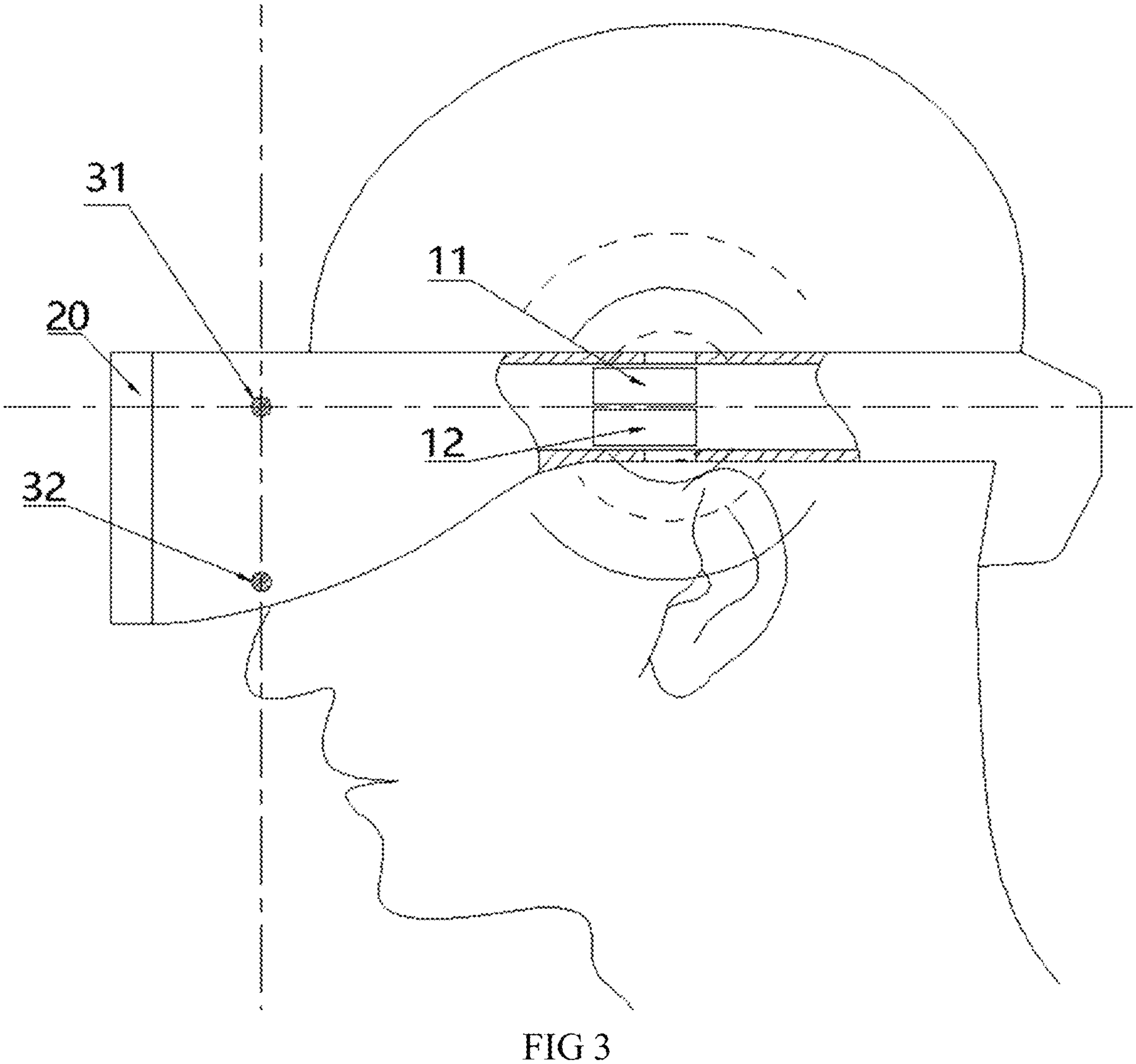
FIG. 3 shows a structural schematic diagram of a far-field muffling self-calibration system for the electronic device in the present disclosure.

For example, in the occasion of FIG. 3, the first speaker 11, the second speaker 12, the first microphone 31, and the second microphone 32 are provided. The distance between the first microphone 31 and the user's mouth is greater than the distance between the second microphone 32 and the user's mouth. In the occasion of FIG. 3, when the product is actually used, the first speaker 11 and the second speaker 12 may be responsible for sending audio signals of equal amplitude and opposite phase, which utilizes the acoustic wave interference principle to realize the far-field muffling while providing the user with the audio information. The processor 20 together with components such as a power supply is provided in the product body of the VR or AR device.

In addition, there may be other numbers of speakers or microphones in some instances. For example, the first speaker, the second speaker, the first microphone, and the second microphone are referred to as one group in an instance, and there are two groups of devices in this instance. Then the two groups of devices may be subjected to the far-field muffling self-calibration of the present disclosure and the uplink noise cancellation self-calibration described later, respectively. For another example, if there is a first microphone and a second microphone and there are four speakers, the four speakers may be divided into two groups, and one of the groups may be selected or two groups may be selected to execute, together with the first microphone and the second microphone, the far-field muffling self-calibration of the present disclosure and the uplink noise cancellation self-calibration described later, which can be set according to the actual situation.

In a specific embodiment of the present disclosure, the electronic device further comprises a second microphone, and the calibration method for the electronic device may also comprises:

when it is judged that an uplink noise cancellation self-calibration condition is met, completing an uplink noise cancellation self-calibration for the electronic device based on the first microphone, the second microphone, the first speaker and the second speaker.

Considering that in the current mainstream communication products, the uplink noise cancellation calibration is usually carried out before the product is shipped from the factory. However, due to different scenarios during use, different wearing styles of users, different wear and tear of product parts, etc., a certain error will be brought about, thus degrading the noise calibration function of the product.

Therefore, in the embodiment of the present disclosure, as long as it is judged that the uplink noise cancellation self-calibration condition is met, the uplink noise cancellation self-calibration for the electronic device will be completed based on the first microphone, the second microphone, the first speaker, and the second speaker, which is beneficial to avoid shortcomings of executing only one uplink noise cancellation calibration before shipment.

The specific rules for the establishment of the uplink noise cancellation self-calibration condition can be set and adjusted as needed, but it is understood that it shall be possible to trigger uplink noise cancellation self-calibration of the electronic device even after the electronic device has been used by the user.

For example, in a specific embodiment of the present disclosure, "it is judged that an uplink noise cancellation self-calibration condition is met" may specifically comprises:

when an uplink noise cancellation self-calibration command input by a user is received, or when it is detected that an interval between a current time point and a time point when the uplink noise cancellation self-calibration for the electronic device was completed last time has reached a preset first duration, judging that the noise cancellation self-calibration condition is met.

In this embodiment, the way of triggering the uplink noise cancellation self-calibration is quite reasonable and convenient. Specifically, when the uplink noise cancellation self-calibration command input by a user is received, it indicates that the user is about to use the electronic device, or has noticed that the noise cancellation effect is not satisfactory during use. Therefore, the uplink noise cancellation self-calibration for the electronic device will be proactively triggered, such as when the user inputs the uplink noise cancellation self-calibration command through buttons, touch screens, and other methods. When it is detected that an interval between a current time point and a time point when the uplink noise cancellation self-calibration for the electronic device was completed last time has reached a preset first duration, it indicates that it has been a relatively long time since the last uplink noise cancellation self-calibration was executed, and thus it is possible to judge that the noise cancellation self-calibration condition is met, so as to perform the current uplink noise cancellation self-calibration.

Besides, in other embodiments, it can also be set to execute the uplink noise cancellation self-calibration every time the electronic device is powered on, which may be adjusted according to actual needs.

When completing an uplink noise cancellation self-calibration for the electronic device based on the first microphone, the second microphone, the first speaker and the second speaker, the specifically selected embodiment may be set and adjusted as needed, and the calibration is usually achieved by feedback. For example, in a specific embodiment of the present disclosure, the operation may specifically comprise:

controlling the first speaker or the second speaker to play a third audio after the uplink noise cancellation self-calibration is initiated;

obtaining a fourth frequency response curve through a sound signal acquired by the first microphone, and obtaining a fifth frequency response curve through a sound signal acquired by the second microphone, wherein the sound signal for obtaining the fourth frequency response curve is obtained by the first speaker or the second speaker playing the third audio, and the sound signal for obtaining the fifth frequency response curve is obtained by the first speaker or the second speaker playing the third audio;

judging whether an error between the fourth frequency response curve and the fifth frequency response curve at each designated frequency is within a corresponding preset error range;

if so, judging that the uplink noise cancellation for the electronic device is qualified;

if not, judging that the uplink noise cancellation for the electronic device is not qualified, adjusting a third transfer function and/or a fourth transfer function under a second preset calibration rule, and returning to execute an operation step of the "controlling the first speaker or the second speaker to play a third audio";

wherein the third transfer function represents a sound signal transfer function from the first microphone to the first speaker, and the fourth transfer function represents a sound signal transfer function from the second microphone to the first speaker.

In this embodiment, after playing the third audio, the fourth frequency response curve may be obtained based on the sound signal acquired by the first microphone, and the fifth frequency response curve may be obtained based on the sound signal acquired by the second microphone. By using the fourth and fifth frequency response curves, it is convenient and fast to judge whether the current uplink noise cancellation for the electronic device is qualified. If the uplink noise cancellation is qualified, the calibration process for the current uplink noise cancellation may be directly ended, that is, there is no need to execute the uplink noise cancellation calibration.

The third audio may be pre-set, and the processor will control the first speaker or second speaker to play the third audio. If the uplink noise cancellation for the electronic device is qualified, the fourth frequency response curve obtained by the first microphone based on it should be consistent with the fifth frequency response curve obtained by the second microphone based on it. Correspondingly, if it is judged that at least one of the errors in the fourth frequency response curve and the fifth frequency response curve at various specified frequencies is not within the corresponding preset error range, it indicates that the uplink noise cancellation for the electronic device is not qualified, and the third and/or fourth transfer functions may be adjusted under the second preset calibration rule. The second preset calibration rule may be set as needed and may reduce the deviation between the fourth frequency response curve and the fifth frequency response curve. That is, it is possible to make the fourth frequency response curve converge with the fifth frequency response curve, thereby achieving a good calibration effect for the uplink noise cancellation.

For example, in a specific embodiment of the present disclosure, "adjusting a third transfer function and/or a fourth transfer function under a second preset calibration rule, and returning to execute an operation step of the 'controlling the first speaker or the second speaker to play a third audio'" may specifically comprise:

controlling the first speaker or the second speaker to play a fourth audio;

obtaining a sixth frequency response curve through a sound signal received by the first microphone, and obtaining a seventh frequency response curve through a sound signal received by the second microphone, wherein the sound signal for obtaining the sixth frequency response curve is obtained by the first speaker or the second speaker playing the fourth audio, and the sound signal for obtaining the seventh frequency response curve is obtained by the first speaker or the second speaker playing the fourth audio;

obtaining a compensation function that is to be fed back into the third transfer function by subtracting a preset second standard frequency response curve from the sixth frequency response curve, obtaining a compensation function that is to be fed back into the fourth transfer function by subtracting the preset second standard frequency response curve from the seventh frequency response curve, and returning to execute an operation step of the "controlling the first speaker or the second speaker to play a third audio".

Figure 4A:
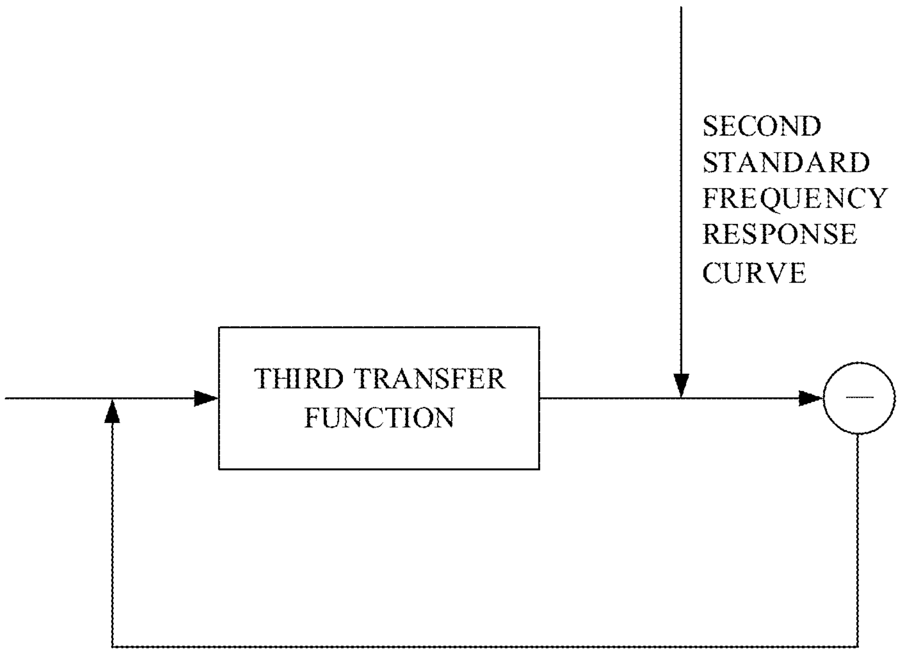
FIG. 4*a* shows a schematic diagram of an algorithmic framework where the compensation function is feedback to a third transfer function in the present disclosure.

In this embodiment, the first speaker or the second speaker is controlled to play the preset fourth audio, and after the fourth audio is played, the corresponding sixth frequency response curve may be obtained from the sound signal received by the first microphone, and the sound signal used to obtain the sixth frequency response curve is collected by the first microphone after the first speaker or second speaker plays the fourth audio. Please refer to FIG. 4*a*, the compensation function for feedback to the third transfer function may be obtained by subtracting a preset second standard frequency response curve from the sixth frequency response curve. That is, by adjusting the third transfer function through the compensation function, the sixth frequency response curve may approach the second standard frequency response curve.

Figure 4B:
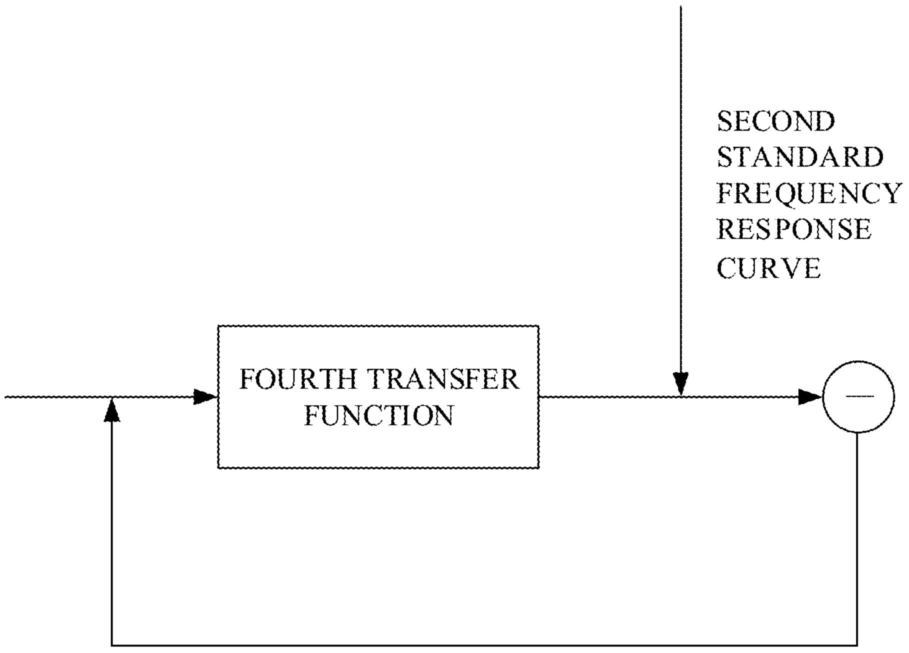
FIG. 4*b* is a schematic diagram of an algorithmic framework where the compensation function is feedback to a fourth transfer function in the present disclosure.

Similarly, the corresponding seventh frequency response curve may be obtained from the sound signal received by the second microphone, and the sound signal used to obtain the seventh frequency response curve is collected by the second microphone after the first speaker or second speaker plays the fourth audio. Please refer to FIG. 4*b*, the compensation function for feedback to the fourth transfer function may be obtained by subtracting the preset second standard frequency response curve from the seventh frequency response curve. That is, by adjusting the fourth transfer function through the compensation function, the seventh frequency response curve may approach the second standard frequency response curve.

The second standard frequency response curve is an ideal frequency response curve which may be obtained based on the sound signal acquired by the first microphone or the second microphone after the fourth audio is played under the condition that the electronic device has ideal uplink noise cancellation, and may be set through theoretical analysis in combination with experimental data.

After adjusting the third and fourth transfer functions through feedback, it is possible to return the operation step of the "controlling the first speaker or the second speaker to play the third audio", so as to rejudge whether the error of the fourth and fifth frequency response curves at each specified frequency is within the corresponding preset error range, until the uplink noise cancellation for the electronic device is judged to be qualified.

In the technical solution provided by the embodiments of the present disclosure, a design solution of the dual-speaker for realizing far-field muffling is adopted, which thus helps to take advantage of the benefits of the good symmetry of the structural design and the convenience of switching the muffling mode of the dual-speaker. Further, the present disclosure also executes the far-field muffling self-calibration, so as to further improve the far-field muffling performance for the electronic device. When executing the far-field muffling self-calibration, the solution of the present disclosure controls the first speaker and the second speaker to play the same first audio by the processor, and the first frequency response curve may be obtained through the sound signal acquired by the first microphone. The performance of the far-field muffling for the electronic device influences the first frequency response curve obtained by the processor. That is, the first frequency response curve may effectively reflect the far-field muffling performance of the electronic device. Therefore, the processor will judge whether the far-field muffling for the electronic device is qualified through the first frequency response curve. If it is not qualified, then it means that the far-field muffling calibration of the electronic device is required. The sound signal transfer function from the first speaker to the first microphone, and the sound signal transfer function from the second speaker to the first microphone, both influence the far-field muffling performance of the electronic device. Therefore, the present disclosure adjusts the first transfer function and/or the second transfer function through the preset first preset calibration rules, thereby completing the far-field muffling calibration of the electronic device. That is, after the calibration is completed, it is possible to determine whether the far-field muffling for the electronic device is qualified from the first frequency response curve. In summary, the present disclosure effectively improves the far-field muffling performance for the electronic device by the far-field muffling calibration.

Corresponding to the above method embodiment, an embodiment of the present disclosure also provides a far-field muffling self-calibration system for the electronic device, which may correspond and refer to the previous text.

Figure 5:
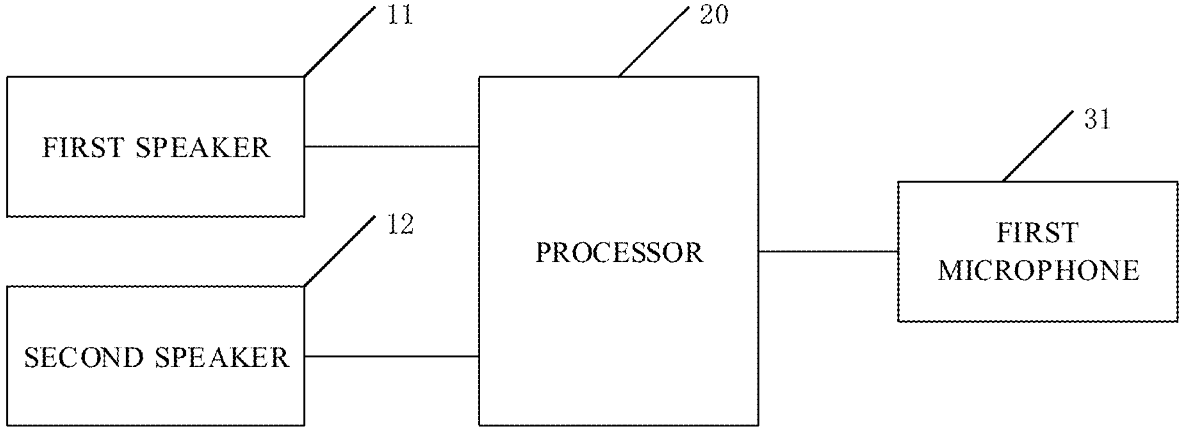
FIG. 5 shows a structural schematic diagram of another far-field muffling self-calibration system for the electronic device in the present disclosure.

Refer to FIG. 5, the far-field muffling self-calibration system for the electronic device may comprise: a first speaker 11, a second speaker 12, a first microphone 31, and a processor 20, and the processor 20 is used for:

- controlling the first speaker 11 and the second speaker 12 to play the same first audio;
- obtaining a first frequency response curve through a sound signal acquired by the first microphone 31, wherein the sound signal for obtaining the first frequency response curve is obtained by the first speaker 11 and the second speaker 12 playing the same first audio; judging whether a far-field muffling of the electronic device is qualified based on the first frequency response curve; if not qualified, adjusting a first transfer function and/or a second transfer function based on a first preset calibration rule, and returning to execute an operation step of the "controlling the first speaker 11 and the second speaker 12 to play the same first audio";
- wherein the first transfer function represents a sound signal transfer function from the first speaker 11 to the first microphone 31, and the second transfer function represents a sound signal transfer function from the second speaker 12 to the first microphone 31.

In a specific embodiment of the present disclosure, the processor 20 judges whether a far-field muffling of the electronic device is qualified based on the first frequency response curve, and is specifically configured for:

- judging whether an error between the first frequency response curve and a preset first standard frequency response curve at each designated frequency is within a corresponding preset error range;
- if so, judging that the far-field muffling of the electronic device is qualified;
- if not, judging that the far-field muffling of the electronic device is not qualified.

In a specific embodiment of the present disclosure, the processor 20 adjusts a first transfer function and/or a second transfer function based on a first preset calibration rule, returns to execute an operation step of "controlling the first speaker 11 and the second speaker 12 to play the same first audio", and is specifically configured for:

- controlling the first speaker 11 to play a second audio;
- obtaining a second frequency response curve through a sound signal acquired by the first microphone 31, wherein the sound signal for obtaining the second frequency response curve is obtained by the first speaker 11 playing the second audio;
- controlling the second speaker 12 to play the second audio;
- obtaining a third frequency response curve through a sound signal acquired by the first microphone 31, wherein the sound signal for obtaining the third frequency response curve is obtained by the second speaker 12 playing the second audio;
- subtracting the third frequency response curve from the second frequency response curve to obtain a compensation function that is to be fed back into the first transfer function or the second transfer function, and returning to execute the operation step of the "controlling the first speaker 11 and the second speaker 12 to play the same first audio".

In a specific embodiment of the present disclosure, the electronic device further comprises a second microphone, and when the electronic device is used by a user, a distance between the first microphone 31 and a user's mouth is greater than a distance between the second microphone and the user's mouth.

In a specific embodiment of the present disclosure, the electronic device further comprises a second microphone, and the processor 20 is configured for:

- when it is judged that an uplink noise cancellation self-calibration condition is met, completing an uplink noise cancellation self-calibration for the electronic device based on the first microphone 31, the second microphone, the first speaker 11 and the second speaker 12.

In a specific embodiment of the present disclosure, the processor 20 judges that an uplink noise cancellation self-calibration condition is met, and is specifically configured for:

- when an uplink noise cancellation self-calibration command input by a user is received, or when it is detected that an interval between a current time point and a time point when the uplink noise cancellation self-calibration for the electronic device was completed last time has reached a preset first duration, judging that the noise cancellation self-calibration condition is met.

In a specific embodiment of the present disclosure, the processor 20 completes an uplink noise cancellation self-calibration for the electronic device based on the first microphone 31, the second microphone, the first speaker 11 and the second speaker 12, and is specifically configured for:

- controlling the first speaker 11 or the second speaker 12 to play a third audio after the uplink noise cancellation self-calibration is initiated;
- obtaining a fourth frequency response curve through a sound signal acquired by the first microphone 31, and obtaining a fifth frequency response curve through a sound signal acquired by the second microphone, wherein the sound signal for obtaining the fourth frequency response curve is obtained by the first speaker 11 or the second speaker 12 playing the third audio, and the sound signal for obtaining the fifth frequency response curve is obtained by the first speaker 11 or the second speaker 12 playing the third audio;

judging whether an error between the fourth frequency response curve and the fifth frequency response curve at each designated frequency is within a corresponding preset error range;

if so, judging that the uplink noise cancellation for the electronic device is qualified;

if not, judging that the uplink noise cancellation for the electronic device is not qualified, adjusting a third transfer function and/or a fourth transfer function under a second preset calibration rule, and returning to execute an operation step of the "controlling the first speaker 11 or the second speaker 12 to play a third audio";

wherein the third transfer function represents a sound signal transfer function from the first microphone to the first speaker 11, and the fourth transfer function represents a sound signal transfer function from the second microphone to the first speaker 11.

In a specific embodiment of the present disclosure, the processor 20 adjusts a third transfer function and/or a fourth transfer function under a second preset calibration rule, and is specifically configured for:

controlling the first speaker 11 or the second speaker 12 to play a fourth audio;

obtaining a sixth frequency response curve through a sound signal received by the first microphone 31, and obtaining a seventh frequency response curve through a sound signal received by the second microphone, wherein the sound signal for obtaining the sixth frequency response curve is obtained by the first speaker 11 or the second speaker 12 playing the fourth audio, and the sound signal for obtaining the seventh frequency response curve is obtained by the first speaker 11 or the second speaker 12 playing the fourth audio;

obtaining a compensation function that is to be fed back into the third transfer function by subtracting a preset second standard frequency response curve from the sixth frequency response curve, obtaining a compensation function that is to be fed back into the fourth transfer function by subtracting the preset second standard frequency response curve from the seventh frequency response curve, and returning to execute an operation step of the "controlling the first speaker 11 or the second speaker 12 to play a third audio".

Corresponding to the above method and system embodiments, an embodiment of the present disclosure provides an electronic device, which may comprise the far-field muffling self-calibration system for the electronic device as described in any one of the above embodiments and will not be repeated herein.

It should also be noted that in this article, relational terms such as first and second, etc., are used solely to distinguish one entity or operation from another, and do not necessarily require or imply any such actual relationship or sequence between those entities or operations. Further, the term "comprise", "include" or any other variation thereof is intended to cover non-exclusive comprising so that a process, method, article or apparatus that comprises a series of elements includes not only those elements, but also other elements that are not expressly listed, or also comprises elements inherent in such process, method, article or apparatus. Without further limitation, the elements defined by the phrase "comprising a . . . " do not preclude the existence of other identical elements in the process, method, article or apparatus that includes the elements.

It will also be appreciated by a skilled person that the unit and algorithm step of each example described in conjunction with the embodiments disclosed herein can be realized by electronic hardware, computer software, or a combination of the two. In order to clearly illustrate the interchangeability of hardware and software, the components and steps of each example have been described in general terms by function in the above description. Whether these functions are performed in hardware or software depends on the specific application and design constraints of the technical solution. A skilled person may use a different method for each particular application to implement the described function, but such implementation shall not be considered beyond the scope of this disclosure.

Specific examples are applied herein to illustrate the principles and implementations of the present disclosure, and the description of the above embodiment is only for the purpose of helping to understand the method of the present disclosure and its core ideas. It should be noted that, for those of ordinary skill in the art, on the premise of not departing from the principles of the present disclosure, certain improvements and modifications may also be made to the present disclosure and also fall within the scope of protection of the present disclosure.

The invention claimed is:

1. A far-field muffling self-calibration method for an electronic device having a first speaker, a second speaker, a processor and a first microphone, comprising:

controlling the first speaker and the second speaker to play a first audio;

obtaining a first frequency response curve through a sound signal acquired by the first microphone, wherein the sound signal for obtaining the first frequency response curve is obtained by the first speaker and the second speaker playing the first audio;

judging whether a far-field muffling for the electronic device is qualified based on the first frequency response curve;

if not qualified, adjusting a first transfer function and/or a second transfer function based on a first preset calibration rule, and returning to execute said controlling the first speaker and the second speaker to play a first audio;

wherein the first transfer function represents a sound signal transfer function from the first speaker to the first microphone, and the second transfer function represents a sound signal transfer function from the second speaker to the first microphone.

2. The far-field muffling self-calibration method for an electronic device according to claim 1, wherein said judging whether a far-field muffling for the electronic device is qualified based on the first frequency response curve, comprises:

judging whether an error between the first frequency response curve and a preset first standard frequency response curve at each designated frequency is within a corresponding preset error range;

if yes, judging that the far-field muffling for the electronic device is qualified;

if not, judging that the far-field muffling for the electronic device is not qualified.

3. The far-field muffling self-calibration method for an electronic device according to claim 1, wherein said adjusting a first transfer function and/or a second transfer function based on a first preset calibration rule, and returning to execute said controlling the first speaker and the second speaker to play a first audio, comprises:

controlling the first speaker to play a second audio;

obtaining a second frequency response curve through a sound signal acquired by the first microphone, wherein the sound signal for obtaining the second frequency response curve is obtained by the first speaker playing the second audio;

controlling the second speaker to play the second audio;

obtaining a third frequency response curve through a sound signal acquired by the first microphone, wherein the sound signal for obtaining the third frequency response curve is obtained by the second speaker playing the second audio;

subtracting the third frequency response curve from the second frequency response curve to obtain a compensation function to be fed back into the first transfer function or the second transfer function, and returning to execute said controlling the first speaker and the second speaker to play a first audio.

4. The far-field muffling self-calibration method for an electronic device according to claim 1, wherein the electronic device further comprises a second microphone, and when the electronic device is used by a user, a distance between the first microphone and the user's mouth is greater than a distance between the second microphone and the user's mouth.

5. The far-field muffling self-calibration method for an electronic device according to claim 1, wherein the electronic device further comprises a second microphone, and the calibration method for an electronic device comprises:

when an uplink noise cancellation self-calibration condition is met, completing the uplink noise cancellation self-calibration for the electronic device based on the first microphone, the second microphone, the first speaker, and the second speaker.

6. The far-field muffling self-calibration method for an electronic device according to claim 5, wherein said an uplink noise cancellation self-calibration condition is met, comprises:

when an uplink noise cancellation self-calibration command input by a user is received, or when an interval between a current time point and a time point when the uplink noise cancellation self-calibration for the electronic device was completed last time reaches a preset first duration, the noise cancellation self-calibration condition is met.

7. The far-field muffling self-calibration method for an electronic device according to claim 5, wherein said completing an uplink noise cancellation self-calibration for the electronic device based on the first microphone, the second microphone, the first speaker, and the second speaker, comprises:

controlling the first speaker or the second speaker to play a third audio after the uplink noise cancellation self-calibration is initiated;

obtaining a fourth frequency response curve through a sound signal acquired by the first microphone, and obtaining a fifth frequency response curve through a sound signal acquired by the second microphone, wherein the sound signal for obtaining the fourth frequency response curve is obtained by the first speaker or the second speaker playing the third audio, and the sound signal for obtaining the fifth frequency response curve is obtained by the first speaker or the second speaker playing the third audio;

judging whether an error between the fourth frequency response curve and the fifth frequency response curve at each designated frequency is within a corresponding preset error range;

if yes, judging that the uplink noise cancellation for the electronic device is qualified;

if not, judging that the uplink noise cancellation for the electronic device is not qualified, adjusting a third transfer function and/or a fourth transfer function under a second preset calibration rule, and returning to execute said controlling the first speaker or the second speaker to play a third audio;

wherein the third transfer function represents a sound signal transfer function from the first microphone to the first speaker, and the fourth transfer function represents a sound signal transfer function from the second microphone to the first speaker.

8. The far-field muffling self-calibration method for an electronic device according to claim 7, wherein said "adjusting a third transfer function and/or a fourth transfer function under a second preset calibration rule, and returning to execute said controlling the first speaker or the second speaker to play a third audio comprises:

controlling the first speaker or the second speaker to play a fourth audio;

obtaining a sixth frequency response curve through a sound signal received by the first microphone, and obtaining a seventh frequency response curve through a sound signal received by the second microphone, wherein the sound signal for obtaining the sixth frequency response curve is obtained by the first speaker or the second speaker playing the fourth audio, and the sound signal for obtaining the seventh frequency response curve is obtained by the first speaker or the second speaker playing the fourth audio;

obtaining a compensation function to be fed back into the third transfer function by subtracting a preset second standard frequency response curve from the sixth frequency response curve, obtaining a compensation function to be fed back into the fourth transfer function by subtracting the preset second standard frequency response curve from the seventh frequency response curve, and returning to execute said controlling the first speaker or the second speaker to play a third audio.

9. A far-field muffling self-calibration system for an electronic device, comprising a first speaker, a second speaker, a first microphone, and a processor, wherein the processor is configured for:

controlling the first speaker and the second speaker to play a the same-first audio;

obtaining a first frequency response curve through a sound signal acquired by the first microphone, wherein the sound signal for obtaining the first frequency response curve is obtained by the first speaker and the second speaker playing the same first audio; judging whether a far-field muffling for the electronic device is qualified based on the first frequency response curve; if not qualified, adjusting a first transfer function and/or a second transfer function based on a first preset calibration rule, and returning to execute said controlling the first speaker and the second speaker to play a first audio;

wherein the first transfer function represents a sound signal transfer function from the first speaker to the first microphone, and the second transfer function represents a sound signal transfer function from the second speaker to the first microphone.

10. An electronic device, comprising a far-field muffling self-calibration system according to claim 9 for the electronic device.

* * * * *